United States Patent [19]
Spring

[11] 3,762,569
[45] Oct. 2, 1973

[54] KEY-OPERATED COIN-CONTROLLED BICYCLE RACK

[76] Inventor: William L. Spring, 801 S. Vail St., Arlington Heights, Ill. 60005

[22] Filed: Mar. 3, 1972

[21] Appl. No.: 231,495

[52] U.S. Cl. .................................... 211/5, 70/235
[51] Int. Cl. ...................... B62h 3/00, E05b 73/00
[58] Field of Search .................... 211/5, 4, 8, 9, 22, 211/20, 17; 70/235, 234, 233; 280/297, 296, 295, 293; 248/203; 58/141, 152 R; 194/DIG. 22

[56] References Cited
UNITED STATES PATENTS
614,826    11/1898   Beardsley et al. ............... 70/235 X
2,118,318   5/1938   Magee ............................ 58/141 X FOREIGN PATENTS OR APPLICATIONS
1,006,071   1/1952   France ............................ 70/233

Primary Examiner—Ramon S. Britts
Attorney—Edward C. Threedy

[57] ABSTRACT

An apparatus for securing a bicycle in a rack provided with a coin-controlled key-operated locking device associated with a permanent rack structure adapted to embrace a substantial portion of the bicycle frame, and a binding member adapted to secure other parts of the bicycle to the rack through the operation of the locking device.

8 Claims, 6 Drawing Figures

PATENTED OCT 2 1973 3,762,569

KEY-OPERATED COIN-CONTROLLED BICYCLE RACK

SUMMARY OF THE INVENTION

A rack adapted to receive a wheel of a bicycle for supporting it in an upright position, with the rack providing additional structural retaining members for supporting portions of the frame of the bicycle when the wheel is received in the rack.

As a part of the additional structural members there is included a latching bar operatively associated with the coin-controlled key-operated locking device for securing the wheel and frame portions of the bicycle in the rack.

The latching system includes a binding member in the form of a chain of sufficient length to be wound in and about parts of the bicycle, with one end of the chain interconnected to the latch bar and interrelated to the coin-controlled key-operated locking device.

GENERAL DESCRIPTION

The invention will be best understood by reference to the accompanying drawings showing the preferred form of construction, and in which.

The principal object of the present invention is to provide a convenient device for securing a parked bicycle in a vertical position and retained therein by an easily operated locking apparatus which is adapted to be coin-controlled and key-operated. The invention may also utilize a timing meter whereby the bicycle may be locked in the parking rack for a specific period of time.

Figure 1:
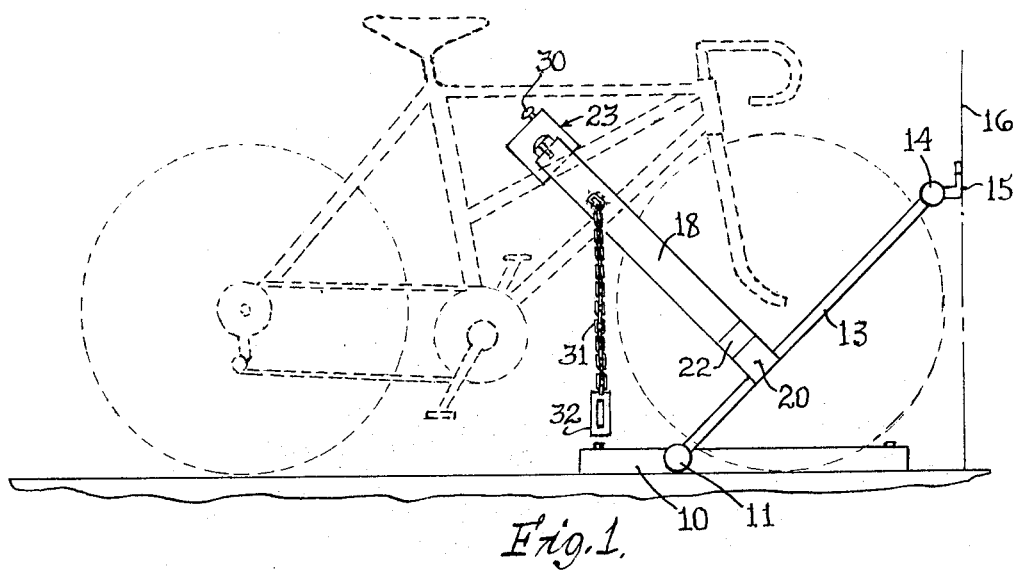
FIG. 1 is a side elevational view of the invention, showing in dotted lines a bicycle mounted therein.
Figure 2:
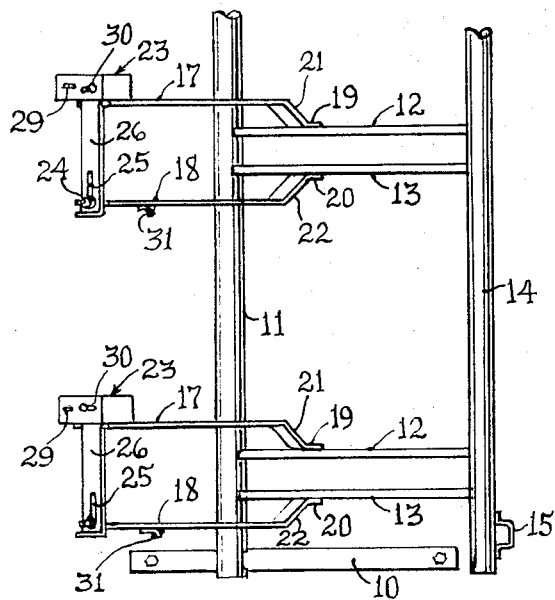
FIG. 2 is a fragmentary top plan view of the invention.

In FIGS. 1 and 2, there is shown the preferred form of construction of the apparatus, which includes a base member 10 which forms an end support for an elongated horizontally extending transversely disposed retaining member 11. It should be noted that any number of base members 10 may be utilized and any length of horizontally disposed retaining members 11 may be employed so as to accommodate any number of parked bicycles.

Extending upwardly and forwardly from the retaining member 11 is a pair of uprights 12 and 13, with these uprights spaced with respect to each other a distance sufficient to permit passage of a bicycle wheel therebetween, but not great enough to allow the axle of the wheel to pass therethrough. There will be a pair of uprights 12 and 13 for each bicycle parked in the rack as clearly indicated in FIG. 2. The forward ends of the uprights 12 and 13 are connected by a second horizontally extending retaining member 14 that lies in a plane parallel to the horizontal retaining member 11 which extends between the base members 10.

Should it be desired, the base member 10 may be suitably anchored into the ground, or the second retainer member 14 may, by a suitable bracket 15, be attached to a wall structure 16, as illustrated in FIG. 1.

Carried by the uprights 12 and 13, below a midpoint thereof, and extending in an opposite direction (shown in FIGS. 1 and 2 as being upwardly and rearwardly), are a pair of supports 17 and 18. The supports 17 and 18 provide flange members 19 and 20, respectively, which are secured to the uprights 12 and 13, respectively, by means of welding or the like. These flange members 19 and 20 support outwardly flared portions 21 and 22, which in turn form the base for the parallelly extending supports 17 and 18, as clearly shown in FIG. 2. By this construction, the supports 17 and 18 are thus spaced farther apart than the uprights 12 and 13 so as to permit passage therethrough of not only the axle of the bicycle wheels, but also the supporting structure thereof.

At the free end of the support 17, there is mounted a suitable locking device 23 which is coin-controlled and key-operated. This device is of a structure well-known in the trade, one form being shown and described in U.S. Pat. No. 617,693, dated Jan. 10, 1899, and, as such, makes up no part of the present invention except as a component having operative cooperation with respect to the specific structure of the invention described herein.

Extending longitudinally from the free end of the support 18 is a circular stud 24 which provides an enlarged head. The stud 24 is adapted to be journaled in an elongated slot 25 formed adjacent one end of a latch bar 26.

By this arrangement, the latch bar 26 is slidably connected to the free end of the support 18 and pivotable about the stud 24 as required. The opposite end of the latch bar 26 has its longitudinal edges tapered inwardly to provide a tongue 27 having a latch-receiving opening 28 formed therein.

By having the latch bar 26 greater in length than the distance between the supports 17 and 18, it may be positioned so as to have its tongue 27 inserted into the locking device 23 to close the space between the free ends of the supports 17 and 18, as shown in FIG. 2.

The locking device 23 provides a slot to receive the tongue 27 of the latch bar 26 and an operative locking bolt (not shown) which is projectable into a latch opening 28 when the locking device is actuated by deposit of a suitable coin in the coin slot 29 and the latching bolt is moved into its locking position through manipulation of the removable key 30.

It should be noted that the supports 17 and 18 are of such length and positioned relative to the uprights 12 and 13 that they will receive bicycles of various sizes and constructions.

Attached to the support 18 is a length of chain 31 which provides at its free end a ringlike latch member 32, with the chain adapted to cooperate in the manner hereinafter described with the latch bar 26 for securing certain components of the bicycle in the rack.

The use of the rack illustrated in FIGS. 1 and 2 is such that the front wheel of the bicycle is positioned between the uprights 12 and 13 as well as between the supports 17 and 18. However, as the supports 17 and 18 are spaced farther apart than the uprights 12 and 13, they will receive therebetween the fork structure of the bicycle as well as a portion of its frame, such as shown in FIG. 1.

To receive the bicycle, the latch bar 26 has been pivoted about the stud 24 from a position wherein it extends between the supports 17 and 18. If the operator wishes, the chain 31 may be passed through the bicycle wheel as well as around other portions of the frame of the bicycle, and will have its ring 32 slipped over the latch bar 26 prior to the insertion of the tongue 27 of the latch bar 26 into the locking mechanism 23. Upon the insertion of a proper coin in the slot 29, the key 30 may be turned to effect throwing of the locking bolt into the latch-receiving opening 28 formed in the tongue 27 of the latch bar 26, locking the bicycle within the rack structure.

Upon reinsertion of the key 30 and the turning of the same, the latch bar 26 is released for removal from the locking device 23 and pivotal movement about the stud 24.

Figure 3:
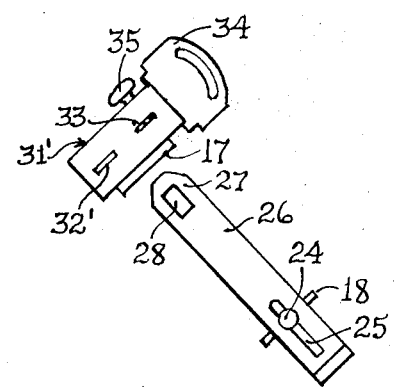
FIG. 3 is a top plan view of the latching bar and coin-controlled key-operated locking device associated with this invention.

Referring to FIG. 3, there is shown a locking device 31' which not only includes a coin slot 32' and a locking key 33, but also a mechanical timing unit 34 which is set by a winding knob 35, operatively released for actuation by deposit of a coin in the coin slot 32'. This device 31' may be used where it is desired to permit the parking of the bicycle in a locking rack for a specific period of time.

Figure 4:
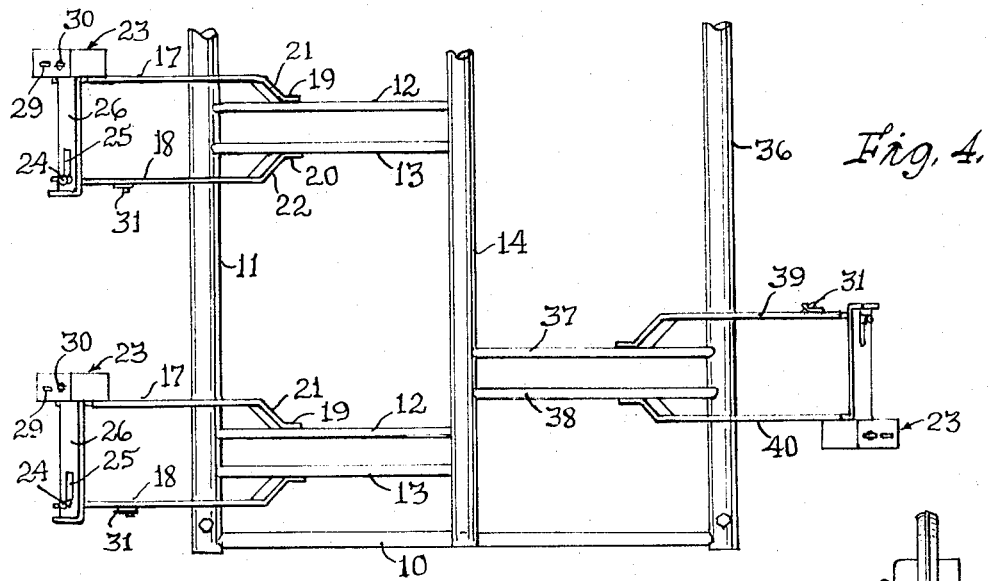
FIG. 4 is a fragmentary top plan view of a modified form of the invention.

In FIG. 4 there is illustrated a construction similar to that shown in FIGS. 1 and 2, but providing a second horizontally extending retaining member 36 which in turn cooperates with the second elevated retaining member 14 to form a base for wheel-receiving uprights 37 and 38 which in turn carry the supports 39 and 40, all of which have a structure similar to that previously described.

Figure 5:
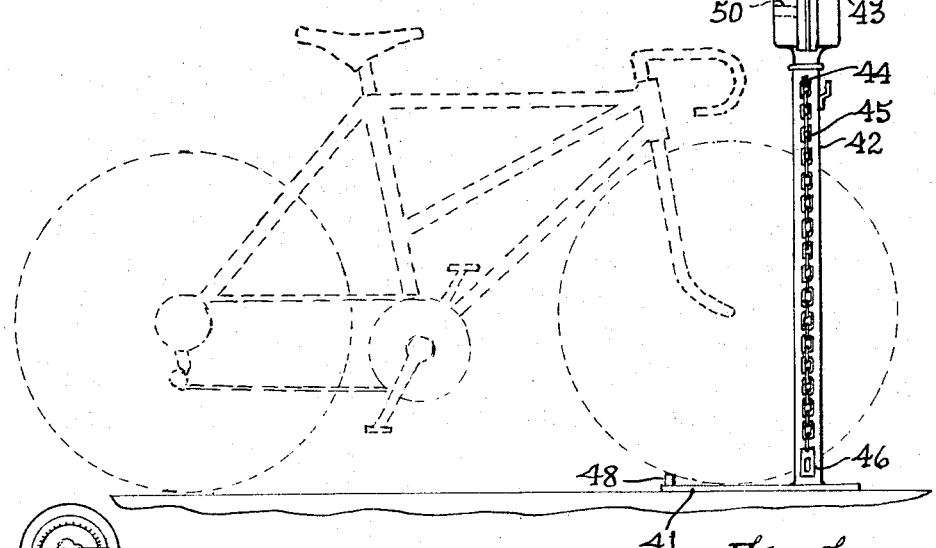
FIG. 5 is a side elevational view of a modified form of the invention.
Figure 6:
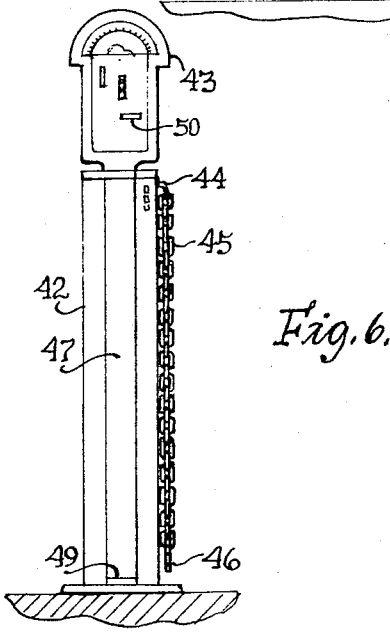
FIG. 6 is a front elevational view of the modified form of the invention shown in FIG. 5.

FIG. 5 shows a modified form of bicycle-parking rack which includes a base plate 41, which has extending therefrom a slotted post 42 having mounted on its uppermost free end a timed locking device 43. Attached to one side wall of the slotted post 42 as at 44 is a chain 45 providing at its free end a locking ring 46.

In operation, the wheel of the bicycle is placed upon the base plate 41 so as to project in an upright position through the center opening 47 provided by the slotted post 42, with the wheel periphery engaging retaining blocks 48 and 49. The chain 45 may then be wound about other portions of the bicycle frame before its locking ring 46 is inserted into the receiving slot 50 formed in the face of the locking device 43. The operation of the locking device 43 is identical to that of the locking devices 23 and 31.

From the foregoing, it is apparent that there is provided a bicycle rack which is adapted to receive not only a wheel of a bicycle, but also a substantial portion of its frame, all of which may be releasably secured in the rack. The construction of the coin-controlled key-operated bicycle rack of my invention is simple yet effective and its method of construction is economical.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A lockable bicycle rack having a locking device that is coin-controlled and key-operated, wherein the improvement comprises
   a. a ground-engaging base member extending longitudinally with respect to the length of the bicycle to be racked,
   b. wheel-retaining members extending horizontally and transversely to said ground-engaging base member with one retaining member connecting thereto and the other disposed in an elevated plane beyond one end thereof so as to receive therebetween the periphery of a wheel of a bicycle,
   c. a pair of uprights angularly extending between and connected to said spaced apart retaining members for receiving therebetween the wheel of the bicycle received between said wheel-retaining members,
   d. a pair of support members each of which is connected to a corresponding upright and disposed at right angles thereto so as to extend in an opposite direction and having their free ends in an elevated plane beyond the other end of said base member and spaced apart so as to receive therebetween a portion of the wheel and a portion of the bicycle frame, and
   e. a locking means mounted on the free end of one of said support members and extending therebetween to releasably retain the bicycle wheel and frame against displacement from the rack.

2. A lockable bicycle rack as defined by claim 1, wherein said locking means comprises an elongated latch bar slidably and pivotally connected to one free end of one of said support members and of a length to extend therebetween, and means for slidably and pivotally connecting said latch bar to said free end of one of said support members.

3. A lockable bicycle rack of claim 2 further defined by having said latch bar provided in one end thereof with an elongated slot extending longitudinally of its length, and said means for connecting said latch bar to the free end of one of said support members comprising a headed stud carried by and extending longitudinally of said one of said support members, with said stud freely projected through said slot formed in said latch bar so as to slidably and pivotally connect said latch bar to said free end of one of said support members.

4. A lockable bicycle rack as defined by claim 1 wherein said pair of support members is provided with inwardly inclined end portions adapted to be connected to said uprights adjacent to their connection to one of said horizontally extending retaining members, and being of a length to extend beyond the periphery of the wheel received between said uprights and said retaining members and beyond a portion of the wheel's supporting frame.

5. A lockable bicycle rack as defined by claim 3 wherein said pair of support members is provided with inwardly inclined end portions adapted to be connected to said uprights adjacent to their connection to one of said horizontally extending retaining members, and being of a length to extend beyond the periphery of the wheel received between said uprights and said retaining members and beyond a portion of the wheel's supporting frame.

6. A lockable bicycle rack as defined by claim 1 and including a chain member one end of which is fixedly connected to one of said support members and with its other end providing means for connection to said locking means for securing said chain about a portion of the bicycle frame when the latter is mounted upon the bicycle rack.

7. A lockable bicycle rack as defined by claim 1 wherein said locking means also includes a timing mechanism actuated simultaneously with said locking means.

8. A lockable bicycle rack as defined by claim 3 wherein said locking means also includes a timing mechanism actuated simultaneously with said locking means

* * * * *